US007484956B2

(12) United States Patent
Kobayashi et al.

(10) Patent No.: US 7,484,956 B2
(45) Date of Patent: Feb. 3, 2009

(54) LOW NOX COMBUSTION USING COGENERATED OXYGEN AND NITROGEN STREAMS

(75) Inventors: Hisashi Kobayashi, Putnam Valley, NY (US); Lawrence E. Bool, East Aurora, NY (US); William J. Snyder, Ossining, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/662,372

(22) Filed: Sep. 16, 2003

(65) Prior Publication Data

US 2005/0058958 A1 Mar. 17, 2005

(51) Int. Cl.
F23J 7/00 (2006.01)
F23C 9/06 (2006.01)
F23L 9/06 (2006.01)

(52) U.S. Cl. ............................. 431/10; 431/4; 431/116; 431/181; 431/190

(58) Field of Classification Search .................. 431/10, 431/9, 11, 4, 15, 116, 190, 181, 174, 350, 431/354, 12; 110/214
See application file for complete search history.

(56) References Cited

U.S. PATENT DOCUMENTS

| 3,699,903 A | 10/1972 | King |
| 3,900,554 A | 8/1975 | Lyon |
| 4,208,386 A | 6/1980 | Arand et al. |
| 4,257,763 A * | 3/1981 | Reed ........................... 431/190 |
| 4,325,924 A | 4/1982 | Arand et al. |
| 4,586,443 A * | 5/1986 | Burge et al. .................... 431/10 |
| 4,773,846 A * | 9/1988 | Munk ............................. 431/4 |
| 4,790,743 A * | 12/1988 | Leikert et al. .................. 431/8 |
| 5,146,858 A * | 9/1992 | Tokuda et al. ............... 110/261 |
| 5,411,394 A * | 5/1995 | Beer et al. ..................... 431/9 |
| 5,724,897 A * | 3/1998 | Breen et al. ................. 110/261 |
| 5,809,910 A * | 9/1998 | Svendssen .................. 110/235 |
| 5,960,724 A | 10/1999 | Toqan et al. |
| 6,030,204 A | 2/2000 | Breen et al. |
| 6,282,901 B1 * | 9/2001 | Marin et al. .................. 60/649 |
| 2002/0025285 A1 | 2/2002 | Comparato et al. |

FOREIGN PATENT DOCUMENTS

DE 28 37 156 A1 * 3/1979
DE 38 07 214 A1 * 9/1989

OTHER PUBLICATIONS

Sarofim et al., "Strategies for Controlling Nitrogen Oxide Emissions During Combustion of Nitrogen Bearing Fuels", 69th Annual Meeting of the AIChE, Chicago, IL, Nov. 1976.
Kobayashi et al, "NOx Emission Characteristics of Industrial Burners and Control Methods Under Oxygen-Enriched Combustion Conditions", International Flame Research Foundation 9th Members' Conference, Noordwijkerhout, May 1989.
Timothy et al., "Characteristics of Single Particle Coal Combustion", 19th Symposium (International) on Combustion, The Combustion Institute, 1983.

* cited by examiner

*Primary Examiner*—Steven B McAllister
*Assistant Examiner*—Sarah Suereth
(74) *Attorney, Agent, or Firm*—Donald T. Black (57) ABSTRACT

Combustion of hydrocarbon fuel is achieved with less formation of NOx by feeding the fuel into a slightly oxygen-enriched atmosphere, and separating air into oxygen-rich and nitrogen-rich streams which are fed separately into the combustion device.

20 Claims, 7 Drawing Sheets

LOW NOX COMBUSTION USING COGENERATED OXYGEN AND NITROGEN STREAMS

This invention was made with United States Government support under Cooperative Agreement No. DE-FC26-00NT40756 awarded by the Department of Energy. The United States Government has certain rights in the invention.

FIELD OF THE INVENTION

The present invention relates to combustion of hydrocarbon fuels containing bound nitrogen, particularly of coal.

BACKGROUND OF THE INVENTION

Environmental awareness is growing in the U.S. and around the world leading to increasing public and regulatory pressures to reduce pollutant emissions from boilers, incinerators, and furnaces. One pollutant of particular concern is NOx (by which is meant oxides of nitrogen such as but not limited to NO, $NO_2$, $NO_3$, $N_2O$, $N_2O_3$, $N_2O_4$, $N_3O_4$, and mixtures thereof), which has been implicated in acid rain, ground level ozone, and fine particulate formation.

A number of technologies are available to reduce NOx emissions. These technologies can be divided into two major classes, primary and secondary. Primary technologies minimize or prevent NOx formation in the combustion zone by controlling the combustion process. Secondary technologies use chemicals to reduce NOx formed in the combustion zone to molecular nitrogen. The current invention is a primary control technology.

In primary control technologies, different combustion strategies are used to control so called "thermal NOx" and "fuel NOx". Thermal NOx is formed by oxidation of nitrogen molecules, $N_2$, primarily in combustion air at high temperature. It is the main source of NOx emissions from natural gas and light oils that do not contain chemically bound nitrogen species. The main control strategy to reduce thermal NOx is to reduce peak flame temperature. Fuel NOx is formed by the oxidation of nitrogenous species contained in fuel and is the main source of NOx emissions from combustion of coal and heavy oil. The current invention relates to improved combustion methods to control fuel NOx emission.

The primary control technology for fuel NOx is commonly called staged combustion in which mixing between the combustion air and fuel is carefully controlled to minimize NOx formation. The formation of NOx from fuel nitrogen is based on a competition between the formation of NOx and the formation of $N_2$ from the nitrogenous species in the fuel volatiles and char nitrogen. Oxygen rich conditions drive the competition towards NOx formation. Fuel rich conditions drive the reactions to form $N_2$. Staged combustion takes advantage of this phenomenon by carefully controlling the mixing of air and fuel to form a fuel rich region to prevent NOx formation. To reduce NOx emissions, the fuel rich region must be hot enough to drive the NOx reduction kinetics. However, sufficient heat has to be transferred from the fuel rich first stage to the furnace heat load in order to prevent thermal NOx formation in the second stage.

A conventional low NOx burner (LNB) includes a fuel rich first zone, near the feed orifice, which is mainly controlled by mixing and combustion of fuel and primary air, and to some extent, additional secondary or tertiary air mixed in this zone. For combustion of pulverized coal the primary air is used to transport the coal particles.

In a second zone, the remainder of the secondary air and any tertiary air mix with the unburned fuel and products of partial combustion from the first stage and complete the combustion. An important process requirement for staged combustion is to transfer a sufficient amount of heat from the fuel rich first stage to the furnace heat load to cool down the combustion products from the first stage. Lower second stage temperature helps to reduce the conversion of remaining nitrogenous compounds to NOx and also to prevent thermal NOx formation in the second stage.

In an aerodynamically staged LNB, all of the combustion air is introduced from the same burner port or adjacent to the burner port. The most common configuration of a low NOx coal burner is to have a series of annular passages for coal/primary air, secondary air and tertiary air. The central passage is often used for oil gun or for natural gas for start up heating. Secondary and tertiary air flows are equipped with swirl generators to impart swirling flows to create a recirculation zone for flame stability. Air velocities and swirl are adjusted to create a relatively large fuel rich first zone along the axis of the burner, followed by relatively gradual mixing of secondary and tertiary air along the length of the furnace. Since sufficient air velocities must be provided to mix fuel and air within the furnace space to complete combustion, it is difficult to create a very large fuel rich zone to provide a long enough residence time for maximum NOx reduction.

Although the LNB is a fairly inexpensive way to reduce NOx and many advancements have been made in the burner design, currently available versions are not yet capable to reach the emissions limits in pending regulations of 0.15 lb (as $NO_2$) per MMBtu of coal fired for utility boilers.

Those skilled in the art have overcome the limitations of an aerodynamically staged LNB by a globally staged combustion arrangement using "over fire air" (OFA). OFA is injected separately from a burner or a group of burners to provide a large fuel rich primary combustion zone (PCZ) and a burnout zone (BOZ) where combustion is completed by mixing OFA and unburned fuel and the products of partial combustion from the PCZ. Typically the OFA ports are separated at least one burner port diameter from the closest burner and several burner port diameters from the furthermost burner. Although the fuel and air mixing and the local stoichiometric conditions near the burner port of an individual burner are similar to those without OFA, a large fuel rich PCZ is formed outside the combustion air mixing zone near the burner. Due to the physical separation of the OFA injection ports, the residence time in the fuel rich PCZ is much longer than that typically obtained in the fuel rich first zone of an aerodynamically staged burner. The combination of LNB's and OFA ports has enabled further reduction in NOx emissions.

S. J. Johnson and R. J. Yang ("Interpretation of Small and Intermediate Scale test Results from a Low NOx Combustion System", International Flame Research Foundation Advanced Combustion Technology Meeting, Noordwijkerhout, Holland, May 12-14, 1980) found that NOx emissions from the coal fired two stage combustion process is strongly dependant on the temperature of the second stage. Their experimental results conducted in small and intermediate scale test furnaces indicated that NOx emission is reduced by about 16% for every 100° F. drop in the theoretical second stage temperature.

Flue gas recirculation (FGR) to the second stage was one of the methods tested to reduce the second stage temperature. FGR can provide a large amount of cooling in the combustion chamber. However, the volume of the flue gas is increased by FGR, which causes a higher pressure drop and a greater heat transfer in the convective section and limits the maximum amount of FGR allowed for a give boiler. Furthermore, handling recycled flue gas is very maintenance intensive. Depending on where the flue gas is extracted from the system, it may contain fly ash and/or sulfuric acid vapors which would make it corrosive to recycling equipment. In addition, it will have residual levels of heat and typically low pressures which require larger pipes to handle the flow rates and may have higher than desired oxygen levels depending on the infiltration of air into the flue system and the overall stoichiometry of the boiler operation. This latter condition can also require greater volumes of flue gas to be required if diluting air to a certain oxygen level is required. The dirty nature of the gas also makes measurement and control difficult; and when systems break down, they are expensive to fix so repairs are not always done. In addition, any off-spec operation of the boiler (e.g. high CO levels) can bring these undesirable contaminants back into the boiler house, creating operator safety issues should leaks develop or process safety issues should combustible gases be present in the recycled stream. In addition, the composition of the flue gas recycled will depend on boiler operating conditions and can vary during boiler transients or off-spec operating conditions.

Low NOx burners and over fire air represent a fairly mature technology and as such are discussed widely throughout the patent and archival literature. Many ideas have been proposed to enhance the effectiveness of LNB's and OFA while minimizing detrimental impacts such as poor flame stability and increased carbon in the ash. Of these ideas two are particularly relevant: preheating the air to the first stage, and converting the combustor to oxy-fuel firing.

Both air preheat and oxy-fuel combustion enhance the effectiveness of staged combustion for fuel NOx reduction by increasing the temperature in the primary combustion zone without increasing the stoichiometric ratio. Oxy-fuel combustion offers the additional advantage of longer residence times in the fuel rich region, due to lower gas flows, which has been shown to reduce NOx emissions. As discussed above, staged combustion uses a fuel rich stage to promote the formation of $N_2$ rather than NOx. Since the reactions to form $N_2$ are kinetically controlled, both the temperature and the hydrocarbon radical concentration are critical to reducing NOx formation. For example, if the temperature is high and the radical concentration is low, such as under unstaged or mildly staged conditions, NOx formation is increased. When the radical concentration is high but the temperature is low, such as under deeply staged conditions, the conversion of intermediate species such as HCN to $N_2$ is retarded. When air is added to complete burnout, the intermediates oxidize to form NOx, therefore the net NOx formation is increased.

Sarofim et al. "Strategies for Controlling Nitrogen Oxide Emissions During Combustion of Nitrogen bearing fuels", 69$^{th}$ Annual Meeting of the AIChE, Chicago, Ill., November 1976, and others have suggested that the first stage kinetics can be enhanced by preheating the combustion air to fairly high temperatures. Alternately Kobayashi et al. ("NOx Emission Characteristics of Industrial Burners and Control Methods Under Oxygen-Enriched Combustion Conditions", International Flame Research Foundation 9$^{th}$ Members' Conference, Noordwijkerhout, May 1989), suggested that using oxygen in place of air for combustion would also increase the kinetics. Oxy-fuel combustion, when flame temperature is controlled by burner design, further reduces thermal NOx formation by substantially eliminating $N_2$ in combustion air. In both cases the net result is that the gas temperature in the first stage is increased, resulting in reduced NOx formation. Further, using both air preheat and oxy-fuel firing allows the first stage to be more deeply staged without degrading the flame stability. This allows even further reductions in NOx formation.

Oxy-fuel firing offers a further advantage for LNB's. Timothy et al ("Characteristics of Single Particle Coal Combustion", 19$^{th}$ Symposium (international) on Combustion, The Combustion Institute, 1983) showed that devolatilization times are significantly reduced, and the volatile yield is increased, when coal is burned in oxygen enriched conditions. These tests were single particle combustion tests performed under highly fuel lean conditions, which does not provide information on how much oxygen is needed to accomplish this under more realistic combustion conditions. The higher volatile yield means that the combustibles in the gas phase increase as compared to the baseline—leading to a more fuel rich gas phase which inhibits NOx formation from the volatile nitrogen species. In addition, the fuel volatiles ignite rapidly and anchor the flame to the burner, which has been shown to lower NOx formation. The enhanced volatile yield also leads to shorter burnout times since less char is remaining.

Although the prior art describes several elegant enhancements for staged combustion and LNB's, several practical problems have limited their application. First, preheating the combustion air to the levels required to enhance the kinetics requires several modifications to both the system and the air piping. The air heater and economizer sections must be modified to allow the incoming air to be heated to higher temperatures, which may require modifications to the rest of the steam cycle components. The ductwork and windbox, as well as the burner itself, must also be modified to handle the hot air. All of the modifications can be costly and can have a negative impact on the operation of the boiler.

The primary barrier to the use of oxy-fuel firing in boilers has been the cost of oxygen. In order for the use of oxygen to be economic the fuel savings achieved by increasing the process efficiency must be greater than the cost of the supplied oxygen. For high temperature operations, such as furnaces without significant heat recovery, this is easily achieved. However, for more efficient operations, such as boilers, the fuel savings attainable by using oxy-fuel firing is typically much lower than the cost of oxygen. For example, if a typical coal-fired utility boiler were converted from air firing to oxygen firing, approximately 15 to 20% of the power output from that boiler would be required to produce the necessary oxygen. Clearly, this is uneconomic for most boilers.

Another potential problem of oxy-fuel firing or oxygen enrichment combustion in the boiler is the unbalancing of heat transfer in the boiler's radiative and convective sections. When oxygen enriched combustion is applied to a boiler furnace designed for air firing, the volume of flue gas is reduced and more heat becomes available and transferred in the radiant section and less heat is transferred in the convective section. Flue gas recirculation may become necessary in order to maintain proper heat transfer to various heat transfer sections of the boiler (i.e., water walls, super heater, reheater, and economizer, and feed water heater). However, handling recycled flue gas is very maintenance intensive and it is desirable to have an alternative clean diluent stream.

The control problem of NOx emissions from a coal fired boiler is further complicated as the firing conditions of the boiler change depending on the power output required for the steam turbine. Under boiler turndown conditions, minimum air flow requirements for the burners and coal mill have to be maintained and adequate mass flow through the boiler needs to be maintained to balance the steam production between the radiative (furnace) and convective sections of the boiler. To accomplish this the burners are typically run with excess air which is an inefficient operating condition and usually increases the overall stoichiometric ratio which often leads to higher NOx emissions per MMBtu fired. Although flue gas recirculation can be applied to reduce the excess air requirement, it complicates the boiler operation and raises the maintenance concerns.

Thus there remains a need for a method for achieving reduced NOx emissions in combustion of fuel (particularly coal) containing one or more nitrogenous compounds and especially for a method which can be carried out in existing furnaces without requiring extensive structural modifications or maintenance.

BRIEF SUMMARY OF THE INVENTION

One aspect of the invention is a combustion method that reduces the amount of NOx emitted, comprising:
(A) providing a combustion device;
(B) feeding primary air and fuel into said device through a burner that comprises means for feeding secondary air into said combustion device and optionally comprises means for feeding tertiary air into said combustion device;
(C) separating air outside the combustion device into an oxygen-rich stream and a nitrogen-rich stream;
(D) combusting said fuel in a flame, while feeding at least a portion of said oxygen-rich stream into said flame,
(E) and feeding at least a portion of said nitrogen-rich stream into said combustion device, preferably through one or both of said means for supplying secondary air and said means for supplying tertiary air.

A preferred embodiment of the present invention is a combustion method that reduces the amount of NOx emitted comprising:
(A) providing a combustion device that has a primary combustion zone and a burn out zone;
(B) feeding air and fuel through a burner into said primary combustion zone;
(C) separating air into an oxygen-rich stream and a nitrogen-rich stream,
(D) combusting the fuel in a flame in the primary combustion zone, while feeding at least a portion of said oxygen-rich stream into said primary combustion zone,
(E) adding air from a source other than said burner into said burn out zone in an amount containing sufficient oxygen that the total amount of oxygen fed into said device is at least the stoichiometric amount needed for complete combustion of said fuel, and combusting residual combustibles from said primary combustion zone in said burn out zone, and
(F) adding at least a portion of said nitrogen-rich stream into said combustion device.

This embodiment of the invention preferably involves the process steps of injecting coal into a boiler, supplying less than the total required air flow to the boiler via combustion air. The remaining air required for combustion is sent to an air separation plant where it is divided into its components: an oxygen-rich stream, and a nitrogen-rich by-product stream. The oxygen-rich stream is injected near the coal feed point into the fuel rich flame zone in the boiler to minimize fuel NOx formation, and the nitrogen rich stream is injected into a later stage of combustion with secondary or tertiary combustion air or with over fire air (OFA) to reduce combustion temperatures and oxygen concentrations resulting in reduced conversion of fuel nitrogen species to NOx and also reduced thermal NOx production. Preferably the boiler combustion system is equipped with OFA ports for NOx reduction and the nitrogen rich gas is injected by premixing with OFA or is injected separately from or near the OFA ports, preferably below the OFA ports.

The amount of air diverted from the combustion device to the air separation plant will typically be between 1 vol. % and 25 vol. % of the air required for combustion, but preferably will be in the 2 vol. % to 15 vol. % range.

As used herein the term "stoichiometric ratio" when used in the context of an oxygen-containing stream and a feed stream of material that can be combusted with oxygen in the stream means the ratio of oxygen in the oxygen-containing stream to the total amount of oxygen that would be necessary to convert fully all carbon, sulfur and hydrogen present in the substances comprising the feed stream into carbon dioxide, sulfur dioxide and water.

As used herein, the term "fuel-rich" means having a stoichiometric ratio less than 1.0 and the term "fuel lean" means having a stoichiometric ratio greater than 1.0.

As used herein, the term "bound nitrogen" means nitrogen present in a molecule other than as $N_2$.

As used herein, the term "primary combustion zone" means the region within a combustion device immediately adjacent the burner outlets and which is mostly occupied by the flame or flames from the burner or burners.

As used herein, the term "burn out zone" means the region within a combustion device that is between the primary combustion zone and the flue, outside the flame or flames that are in the primary combustion zone, where overfire air is injected and the residual fuels and combustibles from the primary combustion zone are burned with overfire air.

As used herein, the term "primary combustion air" or "primary air" means air that has already been commingled with fuel as the fuel and this air are fed into a combustion device, e.g. through an orifice of a burner.

As used herein, the term "secondary combustion air" or "secondary air" means air that is fed into a combustion device through one or more orifices of a burner, but which is not commingled with fuel as this air is fed into the combustion device.

A burner that has orifices for secondary air may have additional orifices for feeding air which additional orifices are further from the point of entry of the fuel through the burner than are the orifices for the secondary air. As used herein, the term "tertiary combustion air" or "tertiary air" means air that is fed into a combustion device through such additional orifices. If a burner also has orifices positioned even further from the point of entry of the fuel than the orifices for the tertiary air, then air fed through such further orifices is termed herein "quaternary combustion air" or "quaternary air".

As used herein, the term "over fire air" (or "OFA") means air which is injected into a combustion device separately from the burner or burners in the combustion device to provide a large fuel rich primary combustion zone and a burnout zone where combustion is completed by mixing OFA with the unburned fuel and the products of partial combustion from the primary combustion zone.

References herein to feeding "oxygen", to the "oxygen" that is fed, and other references herein to the use of "oxygen" in an analogous context, mean gaseous streams that contain $O_2$. Preferably, oxygen is fed as a gaseous stream containing at least 50 vol. % $O_2$, more preferably containing at least 80 vol. % $O_2$, and even more preferably containing at least 90 vol. % $O_2$.

As used herein, an "air separation unit" means a device or system that produces, from a feed stream of a gaseous mixture comprising $O_2$ and $N_2$ such as air, a product stream that is oxygen-enriched and nitrogen-depleted and a product stream that is nitrogen-enriched and oxygen-depleted. "Enriched" means present in the product stream in a higher volume percent compared to the feed stream, and "depleted" means present in the product stream in a lower volume percent compared to the feed stream. Examples of air separation units include cryogenic air separation systems employing distillation and/or rectification, pressure swing adsorption systems, and vacuum pressure swing adsorption systems.

As used herein, "indirect heat exchange" mans effecting the transfer of heat from a first fluid to a second fluid without any physical contact or intermixing of the fluids with each other. Transfer of heat can be by passage directly from the first fluid to the second, such as through a partition separating the fluids, or by transfer of heat from the first fluid to an intermediate object or material such as a recuperator or brickwork, and then from the intermediate object or material to the second fluid.

DETAILED DESCRIPTION OF THE INVENTION

The invention will be described with reference to the Figures, although a description that refers to the Figures is not intended to limit the scope of that which is considered to be the present invention.

Figure 1:
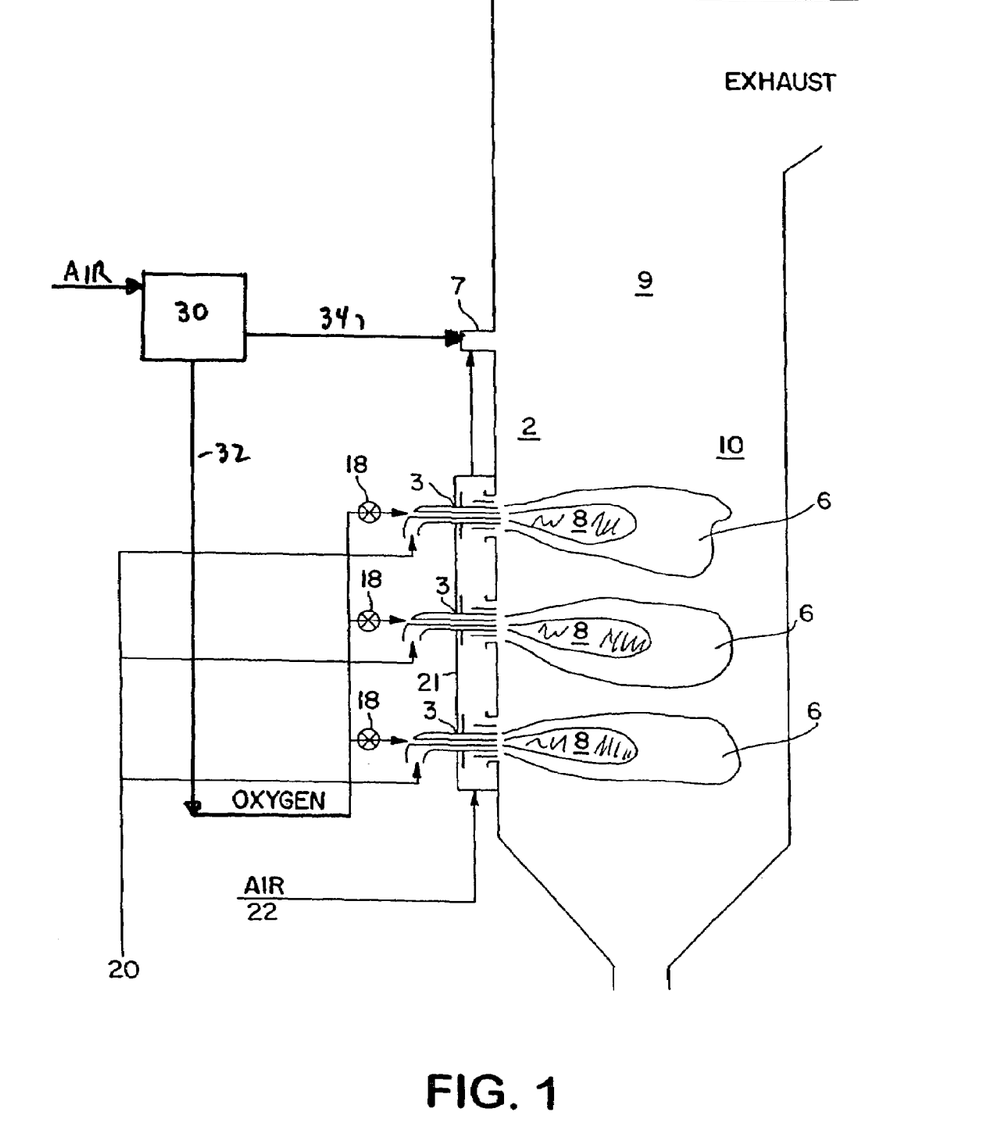
FIG. 1 is a cross-sectional representation of one embodiment of apparatus for carrying out the present invention.

FIG. 1 shows combustion device 1, which can be any apparatus wherein combustion is carried out in the interior 2 of the device. Preferred combustion devices include furnaces and boilers which are used to generate steam to generate electric power by conventional means, not shown. Combustion in the combustion device produces flue gas which leaves the combustion device via a stack at the top.

Each burner 3 in a sidewall or end wall of combustion device 1 feeds fuel, air and oxygen from sources thereof outside the combustion device 1 into the interior 2 of combustion device 1. Suitable fuels include hydrocarbon liquids, such as fuel oil, and also include pulverulent hydrocarbon solids, a preferred example of which is pulverized coal or petroleum coke.

Figure 2:
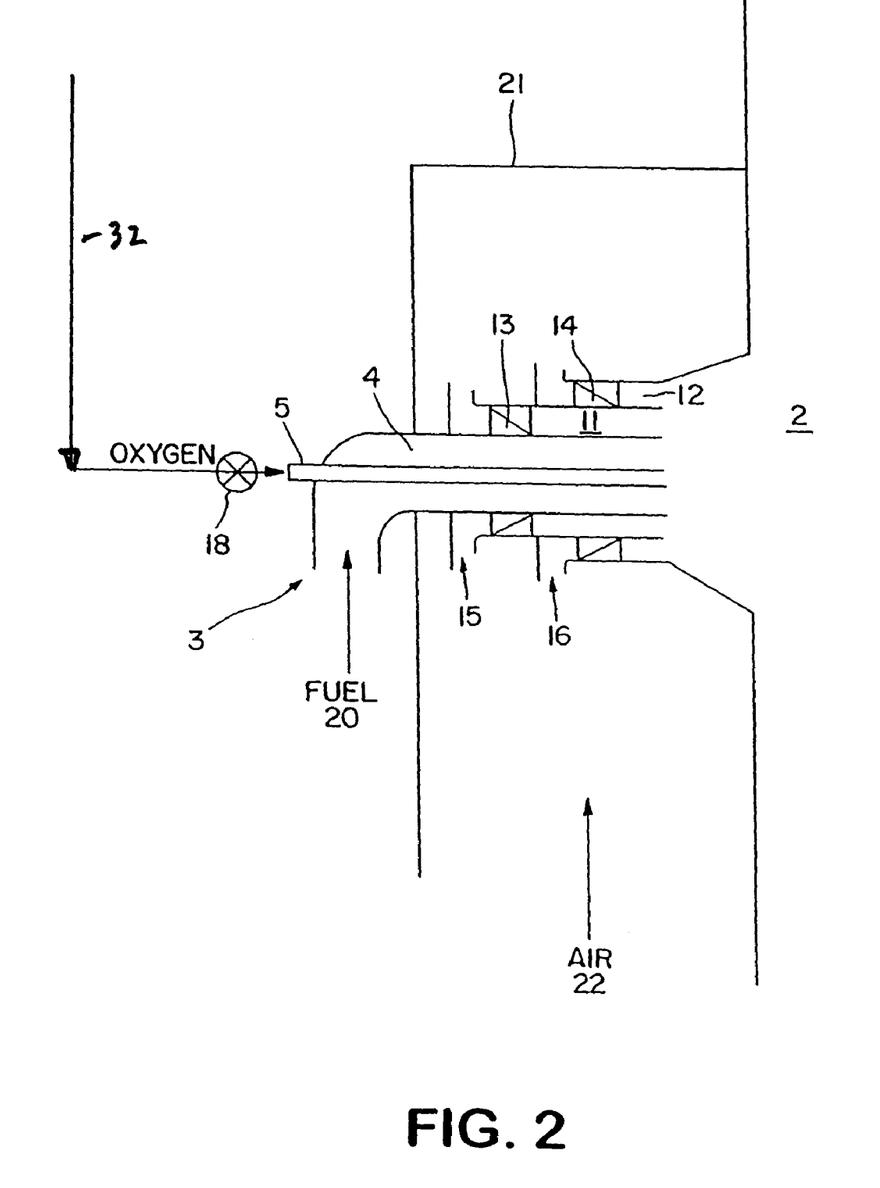
FIG. 2 is a cross-sectional representation of a burner useful for carrying out the present invention.

As seen in FIG. 1 and more closely in FIG. 2, burner 3 is preferably comprised of several concentrically arranged passages, although other constructions to the same effect can be used. The fuel is fed into combustion device 1 through annular passage 4, disposed concentrically around lance 5 through which oxygen is fed as described herein. Preferably, the fuel is transported from a supply source 20 to one or more burners 3 and propelled through burner 3 into the interior 2 of combustion device 1, by suitable pump means in the case of liquids such as fuel oil, and by blowers and impellers of conventional design in the case of hydrocarbon solids such as pulverized coal, which are conventionally fed into the combustion device with the aid of transport air (the "primary air"). Liquid hydrocarbon fuels are preferably fed through one or more atomizing nozzles of conventional design, to feed the liquid fuel into the combustion chamber as discrete, dispersed droplets with atomizing air. An effective amount typically about 1.5 to 2.0 lb of primary air is used to transport 1 lb of coal, which corresponds to about 20% of the stoichiometric combustion air required for complete combustion of bituminous coal. For combustion of heavy oil about 0.5 to 1.0 lb of primary air is used to atomize 1 lb of oil.

From air separation unit 30 two product lines extend: line 32 conveying an oxygen-enriched, nitrogen-depleted stream to the burner, and line 34 conveying a nitrogen-enriched, oxygen-depleted stream to over fire air port or ports 7. The preferred composition of the oxygen-enriched stream is at least 50 vol. % oxygen, more preferably at least 80 vol. % or even at least 90 vol. % oxygen, and less than 50 vol. % nitrogen and more preferably less than 20 vol. % nitrogen. The preferred composition of the nitrogen-enriched stream is at least 85 vol. % nitrogen, more preferably at least 90 vol. % or even at least 95 vol. % nitrogen, and less than 15 vol. % oxygen and more preferably less than 10 vol. % oxygen.

It is expected that the air separation process used for this invention will focus on producing high purity oxygen (>90 vol. %) as its primary product with the by-product or effluent being nitrogen rich gas. A standard nitrogen plant with an oxygen rich by-product stream could also be employed, but would not be as desirable from process considerations.

Figure 2A:
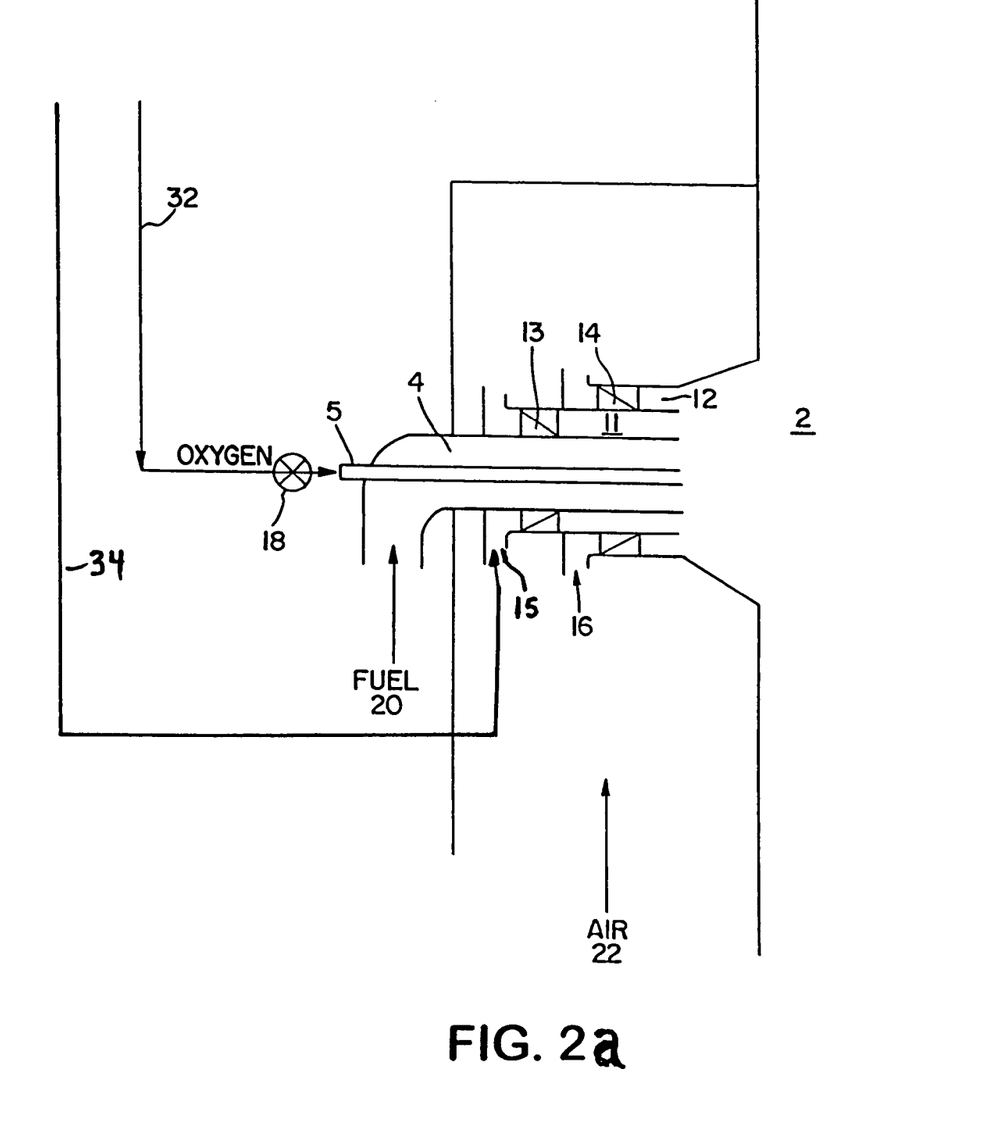
FIG. 2a is a cross-sectional representation of another embodiment of a burner useful for carrying out the present invention.
Figure 2B:
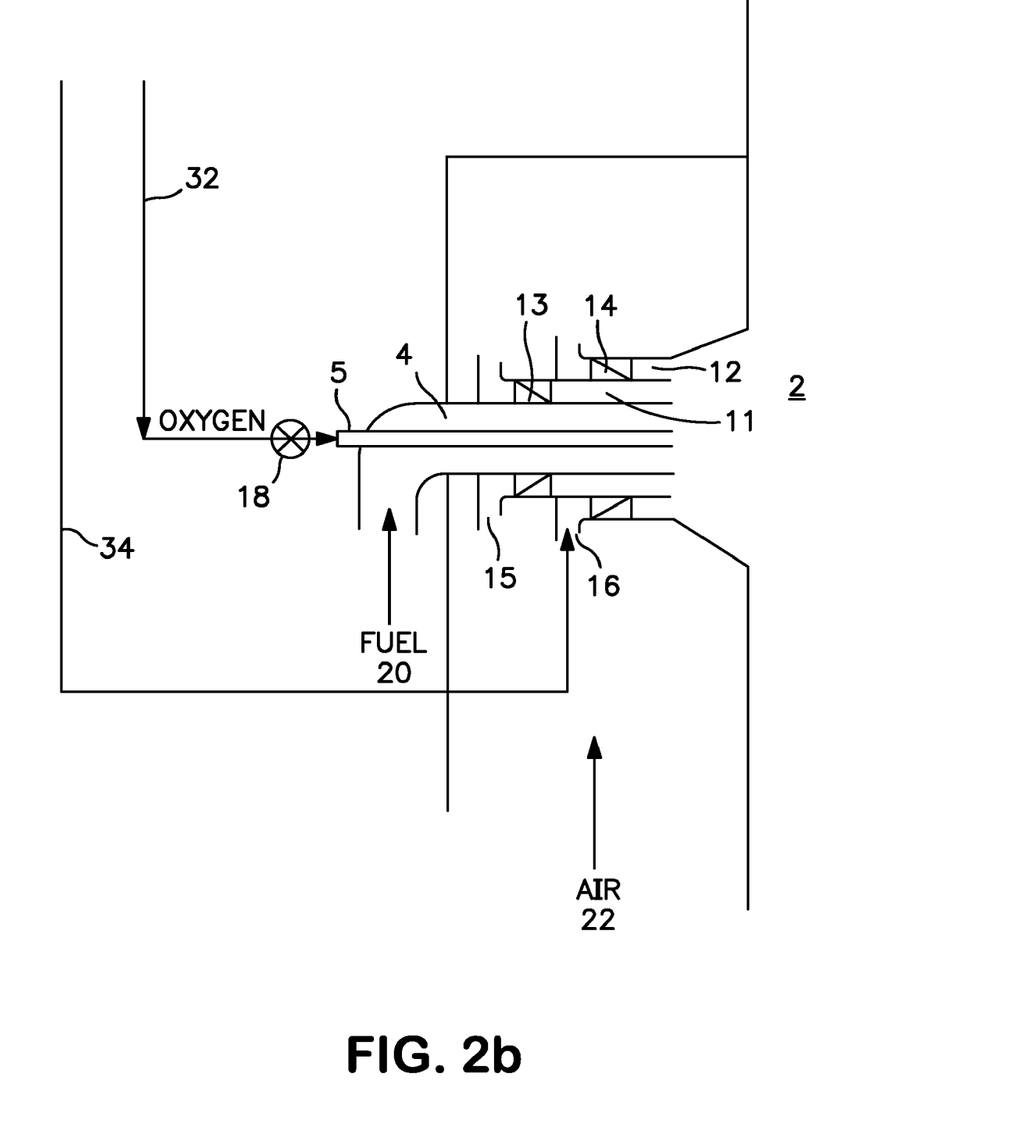
FIG. 2b is a cross-sectional representation of another embodiment of a burner useful for carrying out the present invention.

While FIG. 1 of the drawings illustrates the preferred embodiment, which is feeding the nitrogen-enriched, oxygen depleted stream to the over fire air ports, advantages can also be realized by feeding that stream where the secondary or tertiary combustion air is fed. FIG. 2a illustrates the embodiment wherein the nitrogen-enriched, oxygen depleted stream 34 is fed into secondary combustion air 15. FIG. 2b illustrates the embodiment wherein the nitrogen-enriched, oxygen depleted stream 34 is fed into tertiary combustion air 16.

Combustion air 22 is supplied by an FD fan to one or more windboxes 21 and fed to air passages of one or more burners 3. Secondary combustion air 15 is fed through burner 3 into combustion device 1, preferably through concentrically arranged annular passages 11 surrounding the annular space 4 through which the hydrocarbon fuel is fed. Preferably tertiary combustion air 16 is fed through burner 3 into combustion device 1, preferably through concentrically arranged annular passages 12 surrounding the secondary air passage. Preferably combustion air is also fed through over fire air port 7 (seen in FIG. 1) into combustion device 1. Preferably, the oxygen is fed into the interior 2 of the device apart from secondary and tertiary combustion air. That is, the oxygen that is fed through burner 3 in accordance with this invention is preferably completely consumed in combustion with the fuel, before that oxygen has an opportunity to become commingled with secondary and/or tertiary combustion air before or immediately after it is fed into combustion device 1, especially when no over fire air is used.

Preferred low NOx burners have primary (fuel feeding), secondary and tertiary air passages for good aerodynamic adjustability. However, other low NOx burner designs using only primary and secondary air feeds can be used. Once the optimum settings with the three passages have been determined, the secondary air swirl vanes and passage can be designed to create about the same aerodynamic mixing characteristics as with the three-passage design. Alternatively, burners with an additional (quaternary) passage can be used (such as the RSFC™ burner described in U.S. Pat. No. 5,960,724).

NOx emissions from a coal fired boiler using the oxygen-enriched stream from an air separation plant can be further reduced by using a nitrogen-enriched stream from the same air separation unit, which is normally vented to atmosphere and wasted.

In the burn out zone (BOZ) 9 of the boiler furnace where the residual combustibles from the primary combustion zone (PCZ) 10 is mixed and combusted with over fire air 7, so called thermal NOx is formed and some of the nitrogen species formed in the PCZ from the fuel bound nitrogen are converted to NOx as well. As mentioned in the background section, the formation of both the thermal NOx and the conversion of the nitrogen species to NOx in the BOZ is dependent on the zone temperature. Lower zone temperature and lower excess oxygen reduce NOx formation in the BOZ.

Thermal NOx is controlled by limiting flame temperature and excess oxygen in the fuel lean combustion zones in the furnace. Flue gas recirculation in the BOZ addresses both the thermal NOx formation mechanism and the conversion rate of fuel nitrogen species formed in the PCZ. It does this by diluting the combustion air (i.e. reducing the oxygen concentration) and providing an extra volume of gas to act as a heat sink and reduce the temperatures generated during combustion. Usually flue gas recycle can be employed up to a level where a practical limit is reached. When increased flue gas recycle ratios are used, the heat delivery shifts to the convective section of the boiler because of the larger volume of hot gases that now must pass through it. This heat transfer effect which impacts boiler steam balances is a limitation on using flue gas recycle. Another limitation is the increased pressure drop in the boiler as the volume of flue gas is increased with FGR.

The nitrogen-rich stream from an air separation plant gas can be advantageously applied, without some of the limitations of the FGR method, to dilute the oxygen concentration in over fire air and provide extra gas volume as a heat sink. According to a heat balance calculation under typical boiler furnace condition, for every 1% of stoichiometric air replaced by pure oxygen, the resulting nitrogen rich gas could reduce furnace gas temperatures by approximately 11.7° F. This means that if 10% of the stoichiometric air was replaced by pure oxygen, the furnace gas temperature could be dropped by about 117° F. by using the nitrogen rich stream available from the air separation plant.

Although a greater amount of nitrogen-rich gas injected into the boiler would cool the gas temperature further and reduce NOX emissions, the cost of extra nitrogen and shifting of heat transfer from the radiant section to the convective section limit the maximum amount that can be injected. Typically, the use of nitrogen rich gas will only be economic in boilers already utilizing oxygen for NOx control. The volume of nitrogen-rich gas available is directly related to the volume of nitrogen that was removed from the air to supply the oxygen-rich stream. A preferred amount of nitrogen-rich gas stream injected into the BOZ of a boiler is 10 to 100% of the nitrogen rich stream produced from the air separation plant used to generate the oxygen-rich stream. A more preferred amount of nitrogen-rich gas stream injected into the BOZ of a boiler is 50 to 100% of the nitrogen rich stream produced from the air separation plant used to generate the oxygen-rich stream.

If all of the oxygen-rich stream and the nitrogen rich stream from an air separation plant are injected into a boiler, the net effect to the boiler is to replace some of the preheated combustion air (typically 600° F.) with the equivalent amount of ambient temperature "air" from the air separation plant. There will be a slight efficiency penalty imposed on the boiler under this condition, since some of the air preheat energy is lost. However, this effect is expected to be small given that only up to 25% of the combustion air will be replace with oxygen-rich stream in this process.

This minor efficiency penalty can be eliminated by preheating nitrogen-rich gas by exchanging heat with hot flue gas. If the existing air heater of the boiler is a recuperative type, it may be possible to modify the recuperator to preheat both the combustion air and the nitrogen-rich stream in two different sections of the same recuperator.

Alternatively, the minor efficiency penalty can be eliminated by limiting the amount of nitrogen-rich gas injected into the boiler so that the average oxygen concentration of the mixture of the oxygen-rich stream and the nitrogen-rich stream injected into the boiler is about 23.5%.

The selection of the point at which the nitrogen-rich stream is fed can provide different cost and operational advantages.

For instance, all or part of the nitrogen-rich stream can be piped into preheated air combustion ducts before the windbox which typically supplies the secondary air, the tertiary air, and the over fire air. In this case all of the preheated combustion air streams will be equally diluted with the nitrogen-rich stream. Although the installation cost is relatively low, the following alternative methods may provide better NOx reduction.

Alternatively, all or part of the nitrogen-rich stream can be separately piped into the secondary air passage, the tertiary air passage, or both the secondary and tertiary air passages of each burner. The piping costs will be higher than the previous method, but the amount of the nitrogen-rich stream fed to each burner could be adjusted (separately for each burner) to optimize the NOx reduction.

As another alternative, all or a portion of the nitrogen-rich stream can be fed through its own passage of the burner, so that it emerges from the burner between where the fuel emerges from the burner and where secondary and tertiary air emerge from the burner. The velocity of the nitrogen-rich stream is preferably equal to or below the velocities of the primary fuel stream and the secondary air stream. This alternative delays mixing of secondary and tertiary air with the fuel, and thereby enlarges the fuel rich zone, which would contribute to the reduction of NOx emissions. As yet another alternative, all or a portion of the nitrogen-rich stream can be fed into the interior 2 of the combustion device, into a region that is outside (downstream) of the primary combustion zone and upstream of the burn out zone. In this arrangement the nitrogen rich stream mixes with the combustibles from the PCZ and reduces the gas temperature in the BOZ and reduces NOx emissions. As yet another alternative, all or a portion of the nitrogen-rich stream can be fed at or near the OFA ports. In this arrangement the nitrogen rich stream partially mixes with the OFA streams and reduces the gas temperature in the BOZ and reduces NOx emissions.

When the boiler does not have pressure or heat transfer limitations to pass a larger amount of flue gas, it is possible to combine the injection of recirculated flue gas and the injection of nitrogen-rich gas for further NOx reduction in any of the foregoing methods.

As an alternative, or as a supplement, to the injection of recirculated flue gas or the injection of nitrogen-rich gas, one can inject a spray of liquid water. The water spray can be formed using conventional atomization nozzles either by so-called pressure atomization (in which atomization is achieved without atomization gas by application of pressure to the incoming liquid stream upstream of an atomizing nozzle through which the liquid stream is forced), or by gas atomization which requires application of an accompanying stream of compressed gas, preferably compressed air or compressed nitrogen rich gas. The preferred methods of water spray injection, including where the water spray enters the combustion chamber, are substantially similar to what has been described above for the injection of the nitrogen rich stream.

Determination of the amount of water to spray into the combustion chamber is facilitated by recognizing that, according to a heat balance calculation under typical boiler furnace conditions, approximately 0.17 lb of water spray or 0.61 lb of nitrogen gas per pound of coal firing rate is required to reduce the flue gas temperature by 100° F. in the burn out zone. Due to the latent heat of evaporation for water the specific injection mass flow rate required for water is only about 28% of that of nitrogen. In designing water spray injection it is important to ensure that the water droplets evaporate within the BOZ. The largest size of the water droplets is preferably less than 500 micron in most applications, more preferably less than 150 micron.

It is also possible to combine the injection of water spray with the injection of recirculated flue gas and/or the injection of nitrogen-rich gas. All theses fluids act as coolants and their effects are additive.

Another advantage of injection of nitrogen rich stream at or near over fire air (OFA) ports is improved mixing. OFA is typically supplied by taking a side stream of combustion air off the existing windbox, thus, the maximum velocity of the OFA streams is limited by the pressure of the combustion air available in the windbox. Because of the large size of the boiler and limited amount and pressure of OFA, mixing with the furnace gases from the PCZ is a chronic problem. This poor mixing can result in high CO emissions, and high levels of unburned carbon in the ash. If the boiler overall stoichiometry is adjusted to compensate for the high CO, then NOx emissions may rise, contrary to the reason the OFA was installed in the first place. Injection of a nitrogen rich stream through or adjacent to the OFA ports at high velocity (such as at least 100 feet per second and preferably more than 200 feet per second) can be beneficial in this situation because it can be made available at a higher pressure. A higher pressure allows a greater injection velocity into the furnace which would enhance the mixing between the OFA and the furnace gases from the PCZ while at the same time diluting the flue gases to absorb heat and reducing the oxygen concentration to avoid high flame temperature. The higher pressures also allow smaller piping to be used which can be retrofitted to existing boilers easier than larger ductwork. The clean gas also facilitates easier gas monitoring and control to insure the system is operating as designed all the time. The nitrogen rich stream can be injected through all of the OFA ports so as to enhance the mixing of OFA and the furnace gas or separately injected from one or more OFA ports, while the other OFA ports are used for air injection only.

Injection of a nitrogen-rich stream into the BOZ is especially advantageous in the case where a selective non-catalytic reduction ("SNCR") system is in place to reduce NOx emissions. This method reduces NOx emissions from boilers and furnaces injecting a reducing reagent such as ammonia, urea, cyanuric acid or ammonium carbonate into the combustion chamber, whereupon the reagent forms amine radicals ($-NH_2$) at high temperature and reacts with NO present in the high temperature combustion gases in the combustion chamber to form $N_2$. This method is well known and is described in numerous aspects in the prior art. Prominent among SNCR processes are those described by Lyon in U.S. Pat. No. 3,900,554 and by Arand et. al. in U.S. Pat. Nos. 4,208,386 and 4,325,924, and recent improvements in the SNCR process include those described in U.S. Pat. No. 6,030,204 and U.S. Patent Application Publication No. US 2002/0025285 A1. The disclosures of these five items are hereby incorporated herein by reference. Ammonia and urea are the preferred reagents. For effective reduction of NOx, the reagent has to be mixed uniformly with the combustion gases containing NOx within the space and residence time available for each combustion process. Uniform mixing is a difficult practical problem as the molar ratio of the reagent to flue gas is on the order of 1,000 to 10,000 for flue gas containing 100 to 1000 ppm of NOx.

Data in the literature suggests that lowering gas temperatures from typical boiler conditions to the optimum temperature can improve the NOx reduction reactions significantly thereby producing less NOx at the same reagent usage, or the same NOx levels with less reagent consumption.

Most boilers are turned down during the daily low power demand period (from about 11 pm to about 5 am). When a boiler is turned down and the firing rate reduced, boiler operating conditions change significantly. Most coal burners operate satisfactorily down to about 70% of the full firing rate, although the reduced gas velocities could change the aerodynamic characteristics of the flame, resulting in higher NOx emissions or poor flame stability. Most coal mills require a minimum amount of air flow rate for proper pulverization and coal transport. Thus, as the coal input to the mill is reduced the ratio of the transport air to coal is increased, which makes the first stage combustion stoichiometric ratio leaner, unless the secondary and tertiary air flow rates are reduced. Further reductions in the firing rate typically require shutting down one or more coal mills and taking the corresponding burners out of service. Typically the burners in the lower elevations are shut down in order to maintain the steam temperature. A greater fraction of the boiler heat input is transferred in the radiant section at low loads and the furnace gas exit temperature (FEGT) is reduced, which reduces the heat transferred in the convective banks. It often becomes difficult to maintain the steam super heat temperature at low loads. In order to increase FEGT, more of the firing rate is shifted toward the upper burners and also excess air is increased in order to shift more heat to the convective banks. The burners out of service, however, have to be cooled by flowing a certain amount of combustion air, which provides additional combustion air to the upper level burners. It increases the stoichiometric ratio of the primary combustion zone and tends to increase specific NOx emissions (lbs NOx/MMBtu). These changes typically result in non-optimized firing conditions, reducing boiler efficiency and increasing specific boiler emissions. Boiler operators have limited options to address these issues and usually allow the boiler to operate under non-optimal conditions during these daily turndown periods.

Adding nitrogen rich gas to the primary combustion air fed to the coal mills or to the secondary and tertiary combustion air to the burners (i.e., to the windbox) at this point in its operation could help by reducing the oxygen content of the combustion air which would reduce the oxygen levels in the boiler and reduce the NOx generated. The additional heat load of the nitrogen-rich gas would also require a slightly higher firing rate to heat the extra gases and a larger volume of hot gases would be available to the convective section to produce more superheated steam. The increased mass throughput at this low firing condition helps the boiler operate closer to its design point and the lower oxygen concentrations help control NOx emissions. Firing with excess air can produce the same heat transfer effects, but at the cost of high emissions due to the NOx issues associated with high oxygen levels in the boiler. FGR could produce similar results if a system is installed, however controlling excess oxygen levels could also be challenging as the returned flue gas will contain some residual oxygen which would have to be compensated for in the control of the process.

Although flame stability is generally more critical at low firing rates and reduced oxygen content of the combustion air would further reduce the flame stability, direct injection of oxygen-rich stream to the coal stream would provide good flame stability and allow the dilution of combustion air at the same time.

The operation of the air separation plant to supply the oxygen-rich stream can be varied when the boiler is turned down. Because turndown periods are usually less than eight hours in length, the oxygen plant may remain at full capacity generating more oxygen than might be needed for injecting in to the boiler. This excess oxygen can be vented or sent to a liquifier for recovery.

Figure 4A:
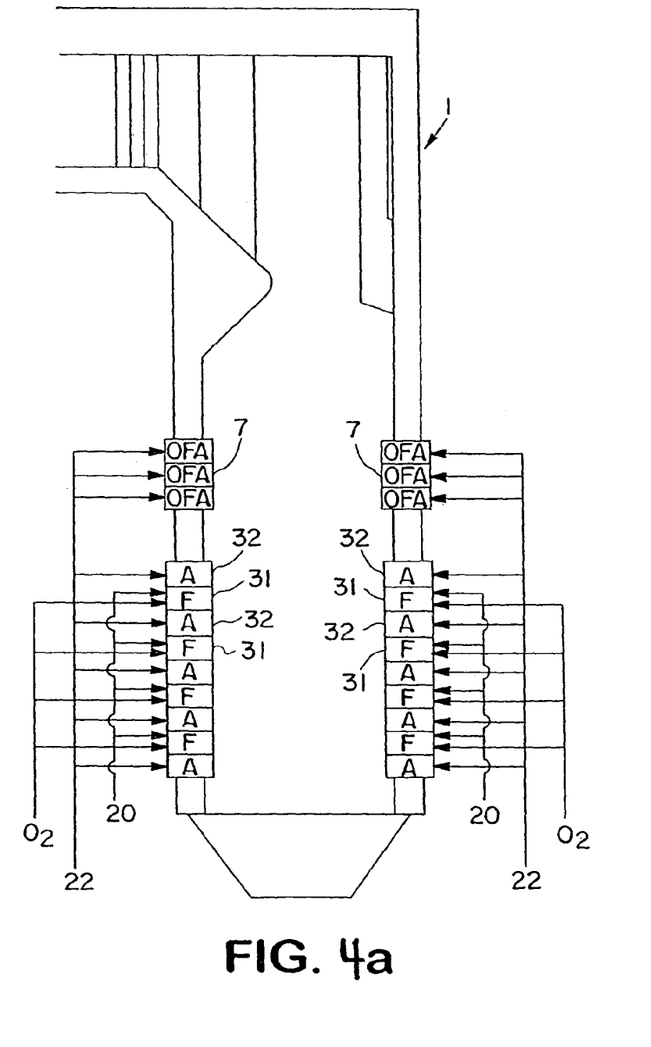
FIG. 4A is a cross-section view of another type of boiler furnace with which the present invention can be utilized, wherein fuel and oxidant are fed from separate ports tangentially into the furnace.

The nitrogen rich gas volume available from the plant will be higher than that originally available from the combustion air and hence a net increase in nitrogen levels can be obtained in the boiler. Because of the inefficient boiler operating conditions, the nitrogen will have a more pronounced positive effect on boiler operation if it is injected in the burner area. This displaces oxygen contained in excess air and can maintain volume flow through the otherwise turned down burners. FIG. 4 depicts this other embodiment for low load operation.

It is expected that more nitrogen rich gas could be used than is available based on the amount of oxygen required for the process and the resulting nitrogen rich gas produced. If economic conditions permit more nitrogen to be used, then an additional source of nitrogen could be utilized. Another approach for multiple boiler installations would be to produce enough oxygen for two or more boilers and then distribute the nitrogen to fewer than the total number so more nitrogen rich gas is available to the boilers using it. This configuration could be especially useful when one boiler is being turned down while another one continues at full load. More nitrogen rich gas would be available to the turned down boiler thereby maximizing the benefits of using nitrogen despite the lower demand for oxygen which results during the turndown condition. If the oxygen plant is not turned down with the boilers, then this does not become an issue as the excess oxygen would be vented or captured for use elsewhere and the nitrogen production would not be decreased.

In boilers using Burner Out Of Service (BOOS) techniques during turndown, it might be possible to preferentially inject the nitrogen in the windbox near the shutdown burners to cool the out of service burners with nitrogen rich gases rather than combustion air. This would further limit excess oxygen levels in the hot flame areas of the boiler. Another possible configuration which would mimic the OFA configuration is to shutdown the uppermost burners so that the cooling combustion air acts as OFA and inject nitrogen into the windbox for the lower burners to try and prevent the primary zone stoichiometric ratio from increasing due to the extra air added under these conditions.

As indicated above, a preferred embodiment of the invention is in the adaptation of a coal-fired combustion device (utility boiler) so that it produces less NOx. Combustion is carried out between the hydrocarbon fuel and the oxygen in the combustion air, resulting in formation of a flame 6. The region 8 of the flame closest to the end of burner 3, that is, where the hydrocarbon fuel emerges from the burner, is the fuel-rich zone of the flame. The area of the flame 6 around its periphery is relatively lean, as secondary and tertiary combustion air has not been fully reacted with fuel. When the amount of combustion air 22 to burner 3 is reduced and a sufficient amount of air is fed from over fire air port 7 for global combustion staging, the entire lower zone of the furnace, or primary combustion zone (PCZ) 10, below over fire air port 7 becomes fuel rich, except the areas near burners 3 where air is injected and not yet fully reacted with fuel.

Then, in the implementation of this embodiment of the present invention, lance 5 for the introduction of additional oxygen is added. The additional oxygen can instead be provided in other ways such as adding it to the primary air. Alternatively, a burner that feeds fuel and combustion air is replaced with a burner that performs as shown in the Figures.

Preferably, air is also fed through over fire air port opening 7 into the interior of combustion device 1, to make the primary combustion zone 10 less fuel lean or more fuel rich and to provide additional oxygen helping to achieve complete combustion of the fuel in the burnout zone 9. The oxygen in the combustion air fed through burner 3, combined with the oxygen contained in air fed at opening 7, if used, are sufficient to enable complete combustion of the fuel, and typically contain 10 to 25 volume percent excess oxygen over the amount required for the complete combustion of the fuel.

Preferably, the secondary and tertiary combustion air are fed at the burner 3 so as to swirl about a longitudinal axis, thereby creating a recirculation zone near each burner and improving commingling of air and fuel. Swirl can be achieved by known techniques, such as providing deflectors, 13 and 14, in the annular passages for secondary and tertiary air flow of the burner which direct the flow of the streams in the desired swirling direction. It is preferred to provide a high degree of swirl, preferably a swirl number, as defined in "Combustion Aerodynamics", J. M. Beer and N. A. Chigier, Robert E. Krieger Publishing Company, Inc., 1983, of 0.6 to 2.0.

In the practice of this invention with over fire air, it is preferred that the total amount of air fed through burner 3, i.e., the sum of primary, secondary and tertiary air, is between 60 and 99% of the stoichiometric air requirement for complete combustion. Most preferably the total amount of air fed through burner 3 is about 70 to 85% of the stoichiometric air requirement for complete combustion.

The velocity of each stream of primary, secondary and tertiary combustion air is preferably 50 to 150 feet per second at the exit of the nozzle from which the air emerges. The velocity of the oxygen injected through lance 5, at the exit of the nozzle from which the oxygen emerges, is preferably within 10% to 900%, more preferably within 25% to 400% of the velocity of the primary air.

Tests have suggested that a preferred approach is to expose at least some of the fuel particles or droplets to a high concentration of oxygen as opposed to uniformly enriching the overall combustion air. The simple approach of injecting oxygen into the windbox 21 of a low NOx burner such that the enriched air is fed to the entire burner, including the critical primary stage air, is not considered as effective.

When oxygen is premixed or mixed rapidly into the coal transport stream (primary air stream) using 20% of stoichiometric air and the overall combustion stoichiometric ratio is 1.15, the following average concentrations of oxygen in the transport air stream and in the overall combustion air are calculated, assuming the air is dry and contains 21.0 vol. % $O_2$.

| % of stoichiometric air replaced with $O_2$ (*) | $O_2$ concentration in transport air (vol. %) | Avg. $O_2$ concentration in total combustion air (vol. %) |
| --- | --- | --- |
| 0 | 21.0 | 21.0 |
| 5 | 24.9 | 21.7 |
| 10 | 28.5 | 22.5 |
| 15 | 31.7 | 23.4 |
| 20 | 34.7 | 24.3 |
| 25 | 37.4 | 25.4 |

(*) e.g. 5 cf of air replaced with 1.95 cf of pure $O_2$ to give the same amount of $O_2$)

In this example, due to the small amount of oxygen used, only modest increases in the oxygen concentration of air are achieved when mixed uniformly even when oxygen is mixed only with the transport air. A preferred method is to inject oxygen into the coal/air transport stream at the tip of the nozzle of the lance. In this case some of the coal particles are mixed with oxygen jets and locally create zones of coal high $O_2$ mixture. Such conditions may provide zones of rapid ignition sources and facilitate early ignition and devolatilization as compared to the case oxygen is premixed with the transport air stream.

Another preferred method is to inject oxygen from the inner or outer annular space adjacent to the coal stream. In this case the favorable oxygen rich combustion condition is provided at the boundary of the coal and oxygen streams.

When oxygen is injected separately at high velocity parallel to the fuel stream, as was the case for Farmayan, et al., the oxygen jet(s) may be diluted quickly with surrounding gases and its effectiveness may be retarded. Thus, the method of oxygen injection has to be carefully designed.

The present invention improves, that is, lessens, the formation of NOx in the combustion device by feeding oxygen into the entering hydrocarbon fuel stream as described herein. More specifically and preferably, the oxygen is fed as a concentrated oxygen stream comprising preferably at least 80 vol. % $O_2$, most preferably at least 90 vol. % $O_2$ and is fed directly into the hydrocarbon fuel as it emerges from the burner and enters the interior 2 of combustion device 1. Thus, at least some of the particles of solid fuel, or the droplets of liquid fuel, as the case may be, enter the combustion device and the fuel-rich portion of flame 6, in a gaseous atmosphere containing a high concentration of oxygen.

When over fire air is used for global combustion staging, preferably with air burners equipped with three or four separate air passages, oxygen may be premixed with the primary or secondary air or both, using suitable spargers within the gas passages in burner 3.

The oxygen is preferably fed through a lance 5 or similar feed line that can be open at the end that opens into combustion device 1, or that is closed at the end and has numerous openings in its periphery adjacent that closed end, such that oxygen flows out through those openings directly into the hydrocarbon fuel entering the combustion device from the burner.

Figure 3A:
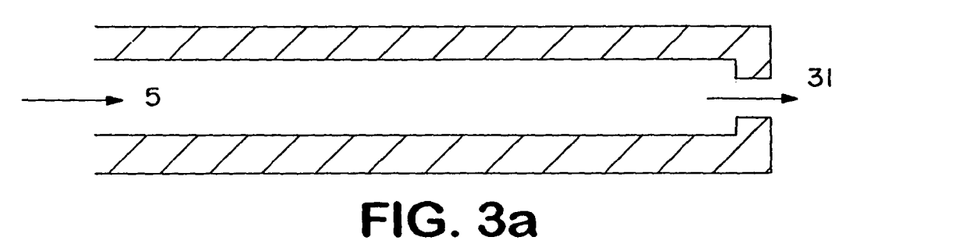
FIGS. 3a-3d are cross-sectional representations of lances useful for feeding oxygen into burners in accordance with the present invention.

FIGS. 3a through 3d show various lance configurations that can be employed. Other lance configurations can be used. In FIG. 3a, lance 5 ends with a single orifice 31 that is preferably oriented along the axis of the lance.

Figure 3B:
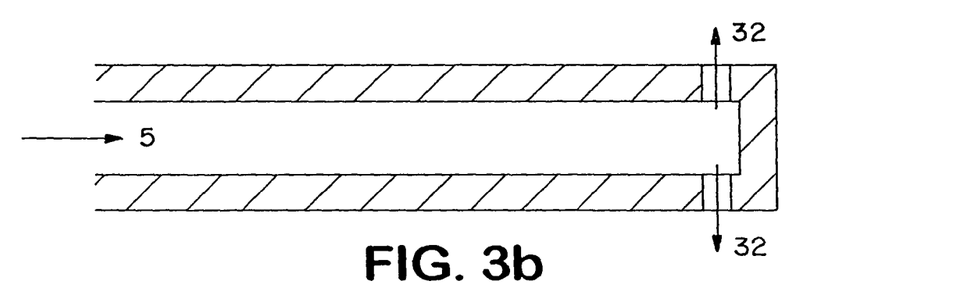

In FIG. 3b, the end of lance 5 is closed and two or more, preferably two to sixteen, more preferably four to eight nozzles along the perimeter of the lance near the hot end of the lance are provided for radial oxygen injection. One to four or more nozzles can also be provided in the end of this lance.

Figure 3C:
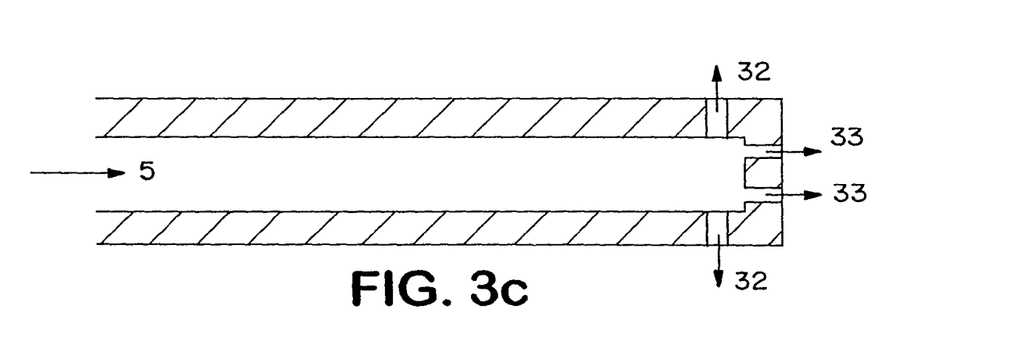

In FIG. 3c, two or more and preferably two to sixteen, more preferably four to eight nozzles 32 are provided radially near the closed downstream end of the lance 5, and two or more, preferably two to sixteen, preferably four to eight nozzles 33 are provided each of which forms an angle greater than 0 degrees and less than 90 degrees to the axis of the direction of flow of oxygen into the lance 5.

Figure 3D:
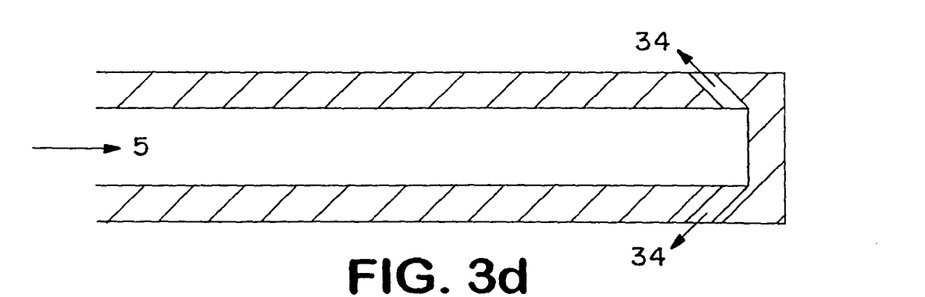

In FIG. 3d, two or more and preferably two to eight nozzles 34 are provided along the perimeter of the lance 5 near the hot end of lance 5, each of which forms an angle of 30 to 60 degrees with respect to the reverse of the direction of flow of oxygen into the lance 5.

In these and other lance embodiments the nozzles through the side of the lance can be arrayed on one or more than one circumference.

When oxygen is injected into combustion device 1 as described herein, the flow rate of combustion air fed through burner 3 is simultaneously reduced to maintain or reduce the primary combustion zone stoichiometric ratio. When over fire air is used, the primary combustion zone stoichiometric ratio with oxygen injection is preferably between 60 and 99%, more preferably about 70 to 85%, of the stoichiometric air requirement for complete combustion. The amount of oxygen fed in this manner should be sufficient to establish a stoichiometric ratio in the fuel-rich zone 8 of flame 6 which is less than about 0.85 and is preferably much less than 0.85, e.g. 0.65 or less. The amount of oxygen fed through line 5 should be less than 25% of the stoichiometric amount required for the complete combustion of the fuel. More preferably, the amount corresponds to less than 15% of the stoichiometric amount required for complete combustion of the fuel. Even more preferably, the amount corresponds to less than 8% of the stoichiometric amount required for complete combustion of the fuel.

NOx emission strongly depends on the local stoichiometric conditions. As injection of oxygen makes the local stoichiometric condition leaner, one has to consider the change in the local stoichiometric conditions after the oxygen injection. For example, injection of oxygen, equivalent to 10% of the stoichiometric air, into a locally fuel rich zone at a stoichiometric ratio of 0.4 (SR=0.4), without changing the flow rate of combustion air being fed, would alter the local stoichiometric conditions to SR=0.5 and would be expected to decrease NOx emissions substantially. However, this is because SR=0.4 is too fuel rich for optimum NOx reduction. Such an effect is much greater than that from "replacing 10% air with oxygen" while keeping the local stoichiometric condition constant at SR=0.4. If the same amount of oxygen is injected into the fuel-rich zone, without changing the flow rate of the combustion air, where the local stoichiometric condition is SR=0.95, NOx emission is expected to increase sharply as the local stoichiometric condition is increased to SR=1.05.

Thus, it is generally preferred to inject oxygen into the richest area of the flame.

Injection or mixing of oxygen into the tertiary air and quaternary, if used, should be avoided in an aerodynamically staged burner without OFA. This is because any tertiary air, and any quaternary air, are mixed in the relatively lean area of a flame. In theory the optimization of local stoichiometric condition can be done with any oxidants including air. However, oxygen is more effective because only a small volume is required and local stoichiometric condition can be changed without a large impact on the overall aerodynamic mixing conditions of the flame.

Another important requirement is that oxygen enrichment has to be done in such a way as to preserve or enhance the physical size of the fuel rich zone (the "$N_2$ forming zone") of an aerodynamically staged flame. The method of oxygen injection and the consequent reduction of air flows in certain air passages of a burner would influence the aerodynamic staging conditions of the burner, and hence the physical size and the local stoichiometric conditions. If the size of the fuel rich zone is reduced and the average gas residence time in the fuel rich zone is reduced as a result of oxygen injection, such a change could cause NOx increases. For example, high velocity injection of oxygen through an axial lance such as the one shown in FIG. 3a would effectively increase the axial momentum of the surrounding coal/air stream, which in turn may enhance the mixing with secondary and tertiary air. As a result the size of the fuel rich NOx reduction zone of the flame may be reduced and NOx may increase. On the other hand when the oxygen flow is injected radially from an axially located oxygen lance such as the one shown in FIG. 3b near the tip of the burner, it may effectively increase the recirculation zone near the burner and hence increase the size of the fuel rich zone and further promote NOx reduction by oxygen enrichment. Complex impacts of oxygen injection on the burner aerodynamic conditions have to be evaluated carefully for a specific burner to achieve NOx reduction.

Without intending to be bound by any particular explanation of the unexpected performance of this invention, the performance of the combustion device operated in accordance with this invention is consistent with a mechanism in which the injected oxygen causes an increase in the temperature of that portion of the flame closest to the burner, which in turn causes relatively volatile components present in the hydrocarbon fuel to enter the gas phase from the fuel and undergo partial reaction with the ambient oxygen, thereby creating a relatively reducing atmosphere that enables nitrogen-containing species released from the combusting fuel to be converted to molecular nitrogen, that is, $N_2$, rather than converted to NOx and other nitrogenous compounds such as HCN and $NH_3$.

Typically, the temperature of the fuel-rich zone into which the fuel and the oxygen enter is on the order of 2500° F. or higher. Feeding the oxygen in this manner can cause the base of flame 6 to draw nearer to the opening of burner 3, or even to become attached to burner 3. However, feeding the oxygen in the manner described herein into the hydrocarbon fuel as it emerges from the burner proceeds in the same manner, even if the flame becomes attached to the burner. In steady state operation, for instance after a combustion device has been retrofitted in accordance with the teachings herein, operation of the combustion device continues on the basis that less than 25%, preferably less than 15%, more preferably less than 8%, of the stoichiometric amount of oxygen required for the complete combustion of the fuel is fed into the fuel, while combustion air is fed through the burner in an amount less than otherwise would be the case, so that the total amount of oxygen fed into the device is at least the stoichiometric amount needed for complete combustion of the fuel.

Using a by-product, nitrogen rich stream from an on-site oxygen plant can simplify the supply of inert gases to the boiler because of the cleanliness and relatively constant composition of the nitrogen rich stream. This, in combination with higher available pressures, can make a nitrogen rich stream very easy to control and measure and could utilize smaller piping and injection systems than recycled flue gas which would lower capital costs for a system. All these factors taken together would make a nitrogen rich injection system very low maintenance and fairly easy to repair when it was required thereby providing increased availability to the boiler operation.

When comparing nitrogen rich gas injection to flue gas recirculation, there are differences that are important to understand. One is that the nitrogen rich gas injection is taking air that would have been input to the process anyway and injecting it in two different fashions to produce a beneficial process change. From an overall thermodynamic standpoint in a well mixed combustion chamber, whether the air is fed into the combustion chamber directly or after separation into an oxygen-rich stream and a nitrogen rich stream, the final gas temperature should be the same. When applying this process to a boiler, there are two factors that cause a cooler second stage temperature by the present invention. In the fuel rich combustion stage a higher flame temperature and a longer gas residence time produced with the oxygen enriched combustion increase heat transfer to the furnace walls and cool the combustion products, which are cooled further by the nitrogen addition. (If no change in overall heat transfer occurs, the oxygen enriched combustion gases would be hotter than the equivalent air case, and adding the nitrogen back in would cool them back to the same temperature they would have been at had air been used for combustion.)

Another difference is that combustion air for a coal fired boiler is typically preheated to about 500 to 600 F and the oxygen rich and the nitrogen rich streams are typically at ambient temperature, thus the total heat input to the boiler is reduced, which reduces the temperature of the combustion products.

Figure 4B:
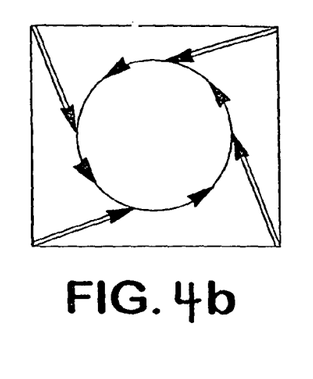
FIG. 4B is a top view of the furnace depicted in FIG. 4A, showing the tangential flow of fuel and oxidant into the furnace.
Figure 4C:
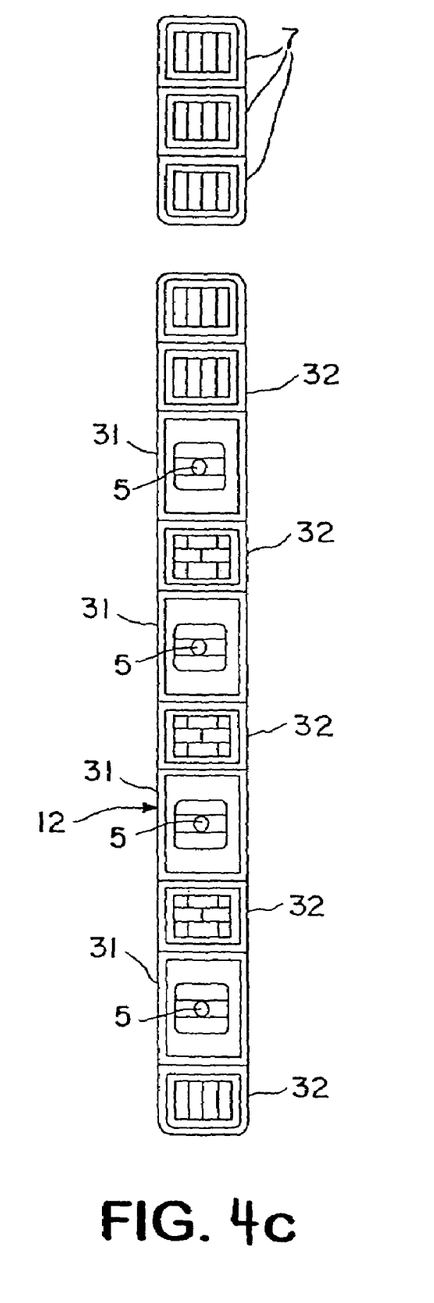
FIG. 4C is a front view from inside the furnace looking at the fronts of the ports.

While the present invention has been described with principal reference to wall-fired boilers such as the type illustrated in FIGS. 1 and 2, this description is not intended to suggest that the invention is limited in applicability to that type of combustion system. The invention is applicable to other systems wherein fuel and air are combusted, including without limitation the tangentially-fired systems of the type described with respect to FIGS. 4A-4C, and combustion systems is known in the art as "cyclone" furnaces, wherein the primary combustion zone of the furnace includes one or more enclosures each having a cylindrical wall, a closed end wall, and an open end that opens into the main chamber of the furnace through a wall of the furnace, wherein fuel, combustion air and oxidant (fed in the amounts as taught herein into the fuel) are fed through the cylindrical wall and the end wall into the enclosure in a direction such that they rotate around the central axis of rotation of the enclosure and combust to form a flame and heat of combustion which are emitted through the open end into the main chamber of the furnace.

Other types of burners can be employed in addition to those exemplified herein, such as so-called split-stream burners wherein the stream of fuel is split into a plurality of streams separated from each other, and even diverging from each other, as the fuel enters the combustion chamber. With this type of burner, the oxygen is fed from a corresponding plurality of lances into each stream of fuel, or from a lance with a plurality of nozzles oriented toward each stream of fuel, and the stoichiometric requirements of oxygen are based on the total amounts of fuel and oxygen being fed.

What is claimed is:

1. A combustion method that reduces the amount of NOx emitted, comprising:
   (A) providing a combustion device;
   (B) feeding primary air and fuel into said device through a burner that comprises means for feeding secondary air into said combustion device and optionally comprises means for feeding tertiary air into said combustion device;

(C) separating air outside the combustion device into a gas stream consisting of oxygen-rich gas and a gas stream consisting of nitrogen-rich gas;

(D) combusting said fuel in a flame, while feeding at least a portion of said gas stream consisting of oxygen-rich gas into said flame, (E) and feeding a gas stream consisting of nitrogen-rich gas which is at least a portion of said gas stream consisting of nitrogen-rich gas obtained in step (C) into said means for feeding secondary air into said combustion device.

2. A method according to claim 1 wherein at least a portion of said gas stream consisting of nitrogen-rich gas that is fed into said combustion device in step (E) is fed into said combustion device through both of said means for supplying secondary air and said means for supplying tertiary air.

3. A method according to claim 1 wherein step (E) comprises feeding 10 vol. % to 100 vol. % of the gas stream consisting of nitrogen-rich gas obtained in step (C) into said combustion device.

4. A method according to claim 1 wherein step (E) comprises feeding 50 vol. % to 100 vol. % of the gas stream consisting of nitrogen-rich gas obtained in step (C) into said combustion device.

5. A method according to claim 1 wherein up to 25 vol. % of the stoichiometric amount of oxygen required for combustion of said fuel is supplied by said gas stream consisting of oxygen-rich gas.

6. A method according to claim 1 wherein said gas stream consisting of nitrogen-rich gas that is fed into said combustion device in step (E) is heated before it is fed through said burner by indirect heat exchange with flue gas produced in said combustion device by said combustion.

7. A method according to claim 1 wherein a portion of flue gas produced in said combustion device by said combustion is fed with said gas stream consisting of nitrogen-rich gas that is fed into said combustion device in step (E).

8. A method according to claim 1 wherein a spray of liquid water is fed with said gas stream consisting of nitrogen-rich gas that is fed into said combustion device in step (E).

9. A method according to claim 1 further comprising injecting at least a portion of said gas stream consisting of nitrogen-rich gas that is obtained in step (C) into said primary air that is fed into said device in step (A).

10. A combustion method that reduces the amount of NOx emitted comprising:

(A) providing a combuaion device that has a primary combustion zone and a burn out zone;

(B) feeding air and fuel through a burner into said primary combustion zone;

(C) separating air outside the combustion device into a gas stream consisting of oxygen-rich gas and a gas stream consisting of nitrogen-rich gas;

(D) combusting the fuel in a flame in the primary combustion zone, while feeding a gas stream consisting of oxygen-rich gas which is at least a portion of said gas stream consisting of oxygen-rich gas that is obtained in step (C) into said primary combustion zone, (E) adding air from a source other than said burner into said burn out zone in an amount containing sufficient oxygen that the total amount of oxygen fed into said device is at least the stoichiometric amount needed for complete combustion of said fuel, and combusting residual combustibles from said primary combustion zone in said burn out zone, (F) and feeding a gas stream consisting of nitrogen-rich gas which is at least a portion of said gas stream consisting of nitrogen-rich gas obtained in step (C) into said means for feeding secondary air into said combustion device.

11. A method according to claim 10 further comprising feeding at least a portion of said gas stream consisting of nitrogen-rich gas obtained in step (C) into said burn out zone.

12. A method according to claim 10 wherein step (E) comprises feeding 10 vol. % to 100 vol. % of said gas stream consisting of nitrogen-rich gas obtained in step (C) into said burn out zone.

13. A method according to claim 10 wherein step (E) comprises feeding 50 vol. % to 100 vol. % of said gas stream consisting of nitrogen-rich gas obtained in step (C) into said burn out zone.

14. A method according to claim 10 wherein up to 25 vol. % of the stoichiometric amount of oxygen required for combustion of said fuel is supplied by said gas stream consisting of oxygen-rich gas obtained in step (C).

15. A method according to claim 10 wherein said gas stream consisting of nitrogen-rich gas that is fed into said combustion device in step (E) is heated before it is fed to said burn out zone by indirect heat exchange with flue gas produced in said combustion device by said combustion.

16. A method according to claim 10 wherein a portion of flue gas produced in said combustion device by said combustion is fed with said gas stream consisting of nitrogen-rich gas that is fed into said combustion device in step (E).

17. A method according to claim 10 wherein a spray of liquid water is fed with said gas stream consisting of nitrogen-rich gas that is fed into said combustion device in step (E).

18. A method according to claim 10 wherein the gas stream consisting of nitrogen-rich gas that is fed in step (E) is fed at a velocity sufficient to promote mixing of said air fed in step (E) and residual combustibles from the primary combustion zone in said burn out zone.

19. A method according to claim 10 further comprising injecting into or downstream of said burn out zone a reducing reagent that reacts with NOx to form $N_2$ and thereby lessens the amount of NOx that would otherwise be emitted from said furnace.

20. A method according to claim 10 further comprising injecting at least a portion of said gas stream consisting of nitrogen-rich gas that is obtained in step (C) into said air that is fed into said device in step (A).

* * * * *